(12) United States Patent
Samo et al.

(10) Patent No.: US 11,014,179 B2
(45) Date of Patent: May 25, 2021

(54) FIXTURES FOR ADDITIVELY MANUFACTURED WORKPIECES

(71) Applicant: Delavan Inc., West Des Moines, IA (US)

(72) Inventors: Joseph Samo, Johnston, IA (US); Lukas Shea, Carlisle, IA (US); Thomas J. Ocken, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 422 days.

(21) Appl. No.: 15/922,722

(22) Filed: Mar. 15, 2018

(65) Prior Publication Data

US 2019/0283160 A1    Sep. 19, 2019

(51) Int. Cl.
| | |
|---|---|
| *B23H 11/00* | (2006.01) |
| *B23H 1/00* | (2006.01) |
| *B33Y 30/00* | (2015.01) |
| *B22F 3/105* | (2006.01) |
| *B23H 7/02* | (2006.01) |
| *B22F 10/00* | (2021.01) |

(52) U.S. Cl.
CPC ............ *B23H 11/003* (2013.01); *B23H 1/00* (2013.01); *B23H 11/006* (2013.01); *B22F 10/00* (2021.01); *B22F 2003/1051* (2013.01); *B23H 7/02* (2013.01); *B33Y 30/00* (2014.12)

(58) Field of Classification Search
CPC ...... B22F 2003/1051; B22F 2003/1058; B22F 3/1055; B23H 11/003; B23H 11/006; B23H 1/00; B23H 7/02; B33Y 30/00; B33Y 40/00

USPC ........................................... 219/69.12, 69.17
See application file for complete search history.

(56) References Cited

U.S. PATENT DOCUMENTS

| 3,981,786 A | * | 9/1976 | Andrews | ................ B23H 7/265 |
| | | | | 204/224 M |
| 4,463,241 A | * | 7/1984 | Smith | .................. B23H 11/003 |
| | | | | 219/69.11 |

(Continued)

OTHER PUBLICATIONS

Kemster: "An Introduction to Jig and Tool 1, 11 Design" In: "An Introduction to Jig and Tool Design", Jan. 1, 1974 (Jan. 1, 1974), Hodder and Stoughton, XP055611123, ISBN: 978-0-340-18221-5 pp. 12-24 *p. 16*.

(Continued)

*Primary Examiner* — Tu B Hoang
*Assistant Examiner* — Vy T Nguyen
(74) *Attorney, Agent, or Firm* — Locke Lord LLP; Scott D. Wofsy; Georgi Korobanov (57) ABSTRACT

An electrostatic discharge machining fixture includes a fixture body, two or more electrically conductive face contacts seated in the fixture body, and two or more electrically resistive point contacts seated in the fixture body. The electrically conductive face contacts and the electrically resistive point contacts define a 3-2-1 alignment system to locate an additively manufactured article relative to the fixture body during an electrostatic discharge machining operation. Electrostatic discharge machining arrangements and methods of supporting additively manufactured workpieces during electrostatic discharge machining operations are also described.

9 Claims, 5 Drawing Sheets

(56) References Cited

U.S. PATENT DOCUMENTS

| | | | | |
|---|---|---|---|---|
| 4,667,077 A * | 5/1987 | Goto | ................ | B23H 7/04 |
| | | | | 219/69.12 |
| 5,893,984 A * | 4/1999 | Thompson | ................ | B23H 9/10 |
| | | | | 219/69.15 |
| 6,627,833 B2 * | 9/2003 | Varsell | ................ | B23H 11/003 |
| | | | | 219/69.11 |
| 6,930,272 B1 * | 8/2005 | Limano | ................ | B23H 11/003 |
| | | | | 219/69.12 |
| 8,435,624 B2 | 5/2013 | Weerasinghe et al. | | |
| 9,687,926 B2 | 6/2017 | Mercier et al. | | |
| 2002/0043518 A1 * | 4/2002 | Murai | ................ | B23H 1/022 |
| | | | | 219/69.13 |
| 2008/0277852 A1 * | 11/2008 | Kellerson | ................ | B23Q 3/06 |
| | | | | 269/244 |
| 2010/0252533 A1 * | 10/2010 | Mercier | ................ | B24B 19/14 |
| | | | | 219/69.15 |
| 2010/0301017 A1 * | 12/2010 | Luo | ................ | B23H 11/003 |
| | | | | 219/69.15 |
| 2017/0010085 A1 * | 1/2017 | Abe | ................ | G01B 7/281 |

OTHER PUBLICATIONS

Extended European search report issued in corresponding European application No. 19162892.4 dated Aug. 22, 2019.

\* cited by examiner

FIXTURES FOR ADDITIVELY MANUFACTURED WORKPIECES

BACKGROUND OF THE INVENTION

1. Field of the Invention

The present disclosure relates to additive manufacturing, and more particularly to electrostatic discharge machining (EDM) fixtures, EDM arrangements, and methods of supporting additively manufactured workpieces during EDM operations.

2. Description of Related Art

Additive manufacturing techniques are commonly used to form metallic articles by selectively fusing metallic particulate to an underlying substrate. Once formed it can necessary to remove the article from the substrate using a subtractive manufacturing technique, such as to separate the article from an underlying build plate. Where the article is formed from an high hardness alloy, such as nickel-based steel alloys, it can be necessary to use an electrostatic discharge machining (EDM) to separate the article from the underlying build plate.

In some EDM operations the resulting article can be relatively rough compared to article formed from traditional subtractive manufacturing techniques. The relatively rough surfaces of the additively manufactured article can reduce the effective electrical separation between the additively manufactured article and the fixture supporting the article during an EDM operation, potentially causing arcing between the article and the fixture. The relatively rough surfaces of the additively manufactured article can also wear the fixture supporting the article, reducing the precision with which the fixture can locate the article during subsequent EDM operations.

Such conventional methods and systems have generally been considered satisfactory for their intended purpose. However, there is still a need in the art for improved EDM fixtures, EDM arrangements, and methods of supporting additively manufacturing workpieces during EDM operations. The present disclosure provides a solution for this need.

SUMMARY OF THE INVENTION

An electrostatic discharge machining (EDM) fixture includes a fixture body, two or more electrically conductive face contacts seated in the fixture body, and two or more electrically resistive point contacts seated in the fixture body. The electrically conductive face contacts and the electrically resistive point contacts define a 3-2-1 alignment system to locate an additively manufactured article relative to the fixture body during an EDM operation.

In certain embodiments the fixture body can have a base portion, a back portion extending from the base portion, and a side portion extending from both the base portion and the side portion. Three face contacts can be seated in the base portion of the fixture body. Two point contacts can be seated in the back portion of the fixture body. A single point contact can be seated in the side portion of the fixture body.

In accordance with certain embodiments, the material forming the point contacts can have electrical resistivity that is greater than the material forming the face contacts. The material forming the point contacts can have hardness greater than the material forming the face contacts. The point contacts can be formed from a ceramic material.

It is contemplated that the fixture can include a clamping member. The clamping member can be coupled to the fixture body. The clamping member can be configured and adapted to exert a clamping force in direction toward the face contacts. An additively manufactured workpiece can be supported in the fixture and located relative to the fixture body by the plurality of face contacts and the plurality of point contacts.

An EDM arrangement includes an EDM fixture as described above. The fixture body has a base portion, a back portion extending from the base portion and a side portion extending from the base portion and the back portion. Three of the face contacts are seated in the base portion of the fixture body. Two of the point contacts are seated in the back portion of the fixture body. A single point contact is seated in the side portion of the fixture body. An additively manufactured workpiece supported in the fixture and located relative to the fixture body by each of the plurality of face contacts and each of the plurality of point contacts. In certain embodiments an EDM apparatus can be in electrical communication with the fixture body through the additively manufactured workpiece.

A method of supporting a workpiece during an EDM operation includes, at a fixture as described above, locating a first surface of an additively manufactured workpiece relative to the fixture with the plurality of face contacts. A second surface of the additively manufactured workpiece can be relative to the fixture with two of the plurality of point contacts. A third surface of the additively manufactured workpiece relative to the fixture with one of the plurality of point contacts. A clamping force can be exerted against the workpiece and in a direction towards the face contacts.

It is also contemplated that the additively manufactured workpiece can be electrically separated from the fixture body by the plurality of point contacts. The additively manufactured workpiece can be electrically connected to the fixture body through the plurality of face contacts. A voltage source of an EDM apparatus can be placed in electrical communication with the face contact through the additively manufactured workpiece.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
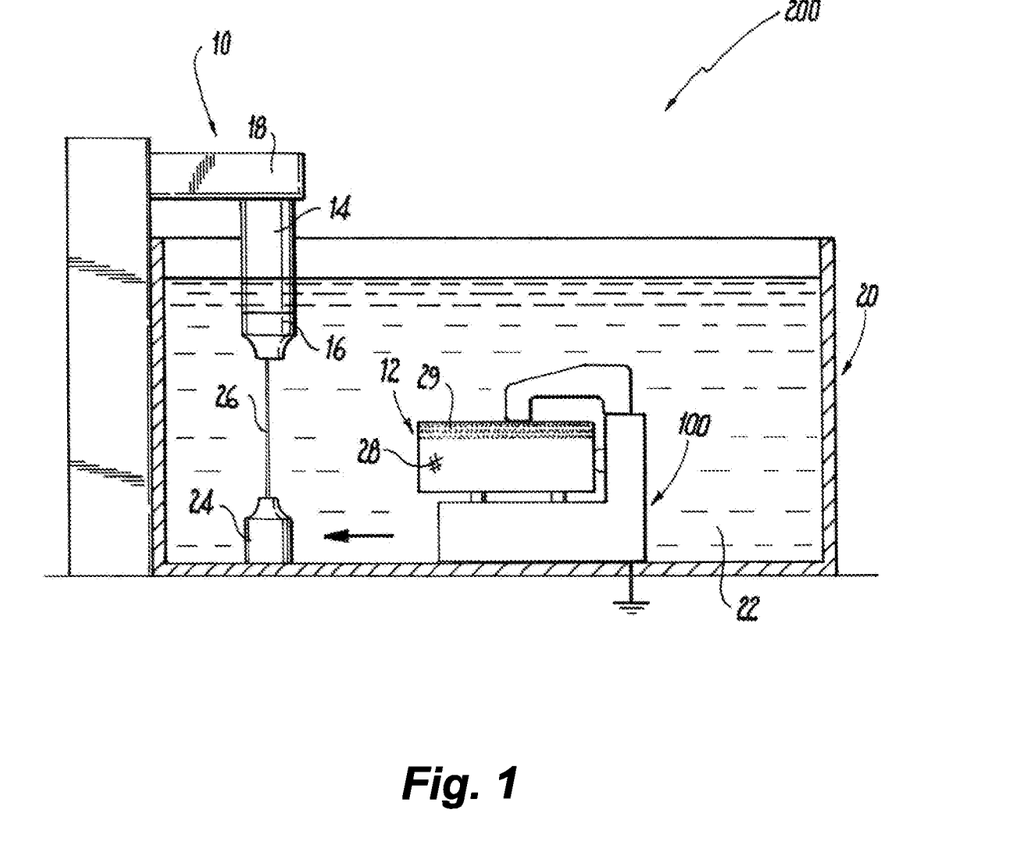
FIG. 1 is a schematic view of an exemplary embodiment of an electrostatic discharge machining (EDM) arrangement constructed in accordance with the present disclosure, showing an additively manufactured workpiece supported in an EDM fixture for removing material from the working using an EDM operation.

Reference will now be made to the drawings wherein like reference numerals identify similar structural features or aspects of the subject disclosure. For purposes of explanation and illustration, and not limitation, a partial view of an exemplary embodiment of an electrostatic discharge machining (EDM) fixture in accordance with the disclosure is shown in FIG. 1 and is designated generally by reference character 100. Other embodiments of EDM fixtures, EDM arrangements, and methods of supporting additively manufactured workpieces during EDM operations in accordance with the disclosure, or aspects thereof, are provided in FIGS. 2-5, as will be described. The systems and methods described herein can be used to remove material from additively manufactured workpieces, such as to separate fuel nozzles formed from nickel-based steel alloys from build plates, though the present disclosure is not limited to nickel-based alloys or to additively manufactured workpieces in general.

Referring to FIG. 1, an EDM arrangement 200 is shown. EDM arrangement 200 includes an EDM apparatus 10, an additively manufactured workpiece 12 and EDM fixture 100. Additively manufactured workpiece 12 includes a metallic material 28, such as nickel-based steel alloy. Metallic material 28 is arranged as plurality of plurality of layers 29 interfused to one another using an additive manufacturing technique. In certain embodiments additively manufactured workpiece 12 includes a fuel nozzle or a fuel injector for a gas turbine engine. Additively manufactured workpiece 12 can be formed using a powder bed fusion technique, a laser sintering technique, or any other additive manufacturing technique.

EDM apparatus 10 has an electrode 14, a holder 16 for electrode 14, and a voltage source 18. Voltage source 18 is in electrical communication with additively manufactured workpiece 12 through EDM fixture 100. EDM fixture 100 supports additively manufactured workpiece 12 and locates additively manufactured workpiece 12 relative to EDM apparatus 10. Although an exemplary wire EDM apparatus is shown, it is to be understood and appreciated that the present disclosure can benefit other types of EDM apparatus, such EDM drill and EDM sinker apparatuses.

EDM fixture 100, additively manufactured workpiece 12 and electrode 14 are each arranged within a tank 20 containing a dielectric fluid 22. Dielectric fluid 22 can be deionized water or any other suitable dielectric fluid. During operation an actuator 24 advances the electrode 14 towards additively manufactured workpiece 12 to create a suitable gap therebetween. Once suitable electrical communication is established between electrode 14 and additively manufactured workpiece 12, a potential difference is applied to across electrode 14 and EDM fixture 100. The potential difference creates a current flow through wire 26 between electrode 14 and EDM fixture 100, i.e., a spark, which removes material from additively manufactured workpiece 12 by selectively vaporizing a portion of metallic material 28 forming additively manufactured workpiece 12.

As will be appreciated by those of skill in the art in view of the present disclosure, surfaces of additively manufactured workpieces, e.g., additively manufactured workpiece 12, can be relatively rough compared to surfaces of articles formed using traditional subtractive manufacturing techniques. The relatively rough surfaces of additively manufactured articles can decrease the effective electrical spacing between the additively manufactured workpiece and the fixture supporting additively manufactured workpiece during EDM operations, increasing the likelihood of arcing between additively the manufactured workpiece and the fixture, potentially damaging the additively manufactured workpiece and fixture supporting the additively manufactured workpiece. The relatively rough surfaces of additively manufactured articles can also cause wear on the portions of the fixture that contacting the additively manufactured workpiece. The wear can reduce the precision with which the fixture positions the additively manufactured workpiece during an EDM operation, potentially causing rework or scrap due to errors during EDM material removal operation. To limit wear and provide suitable electrical separation EDM fixture 100 has both electrically conductive face contacts 104 (shown in FIG. 2) and electrically resistive point contacts 106 (shown in FIG. 2).

Figure 2:
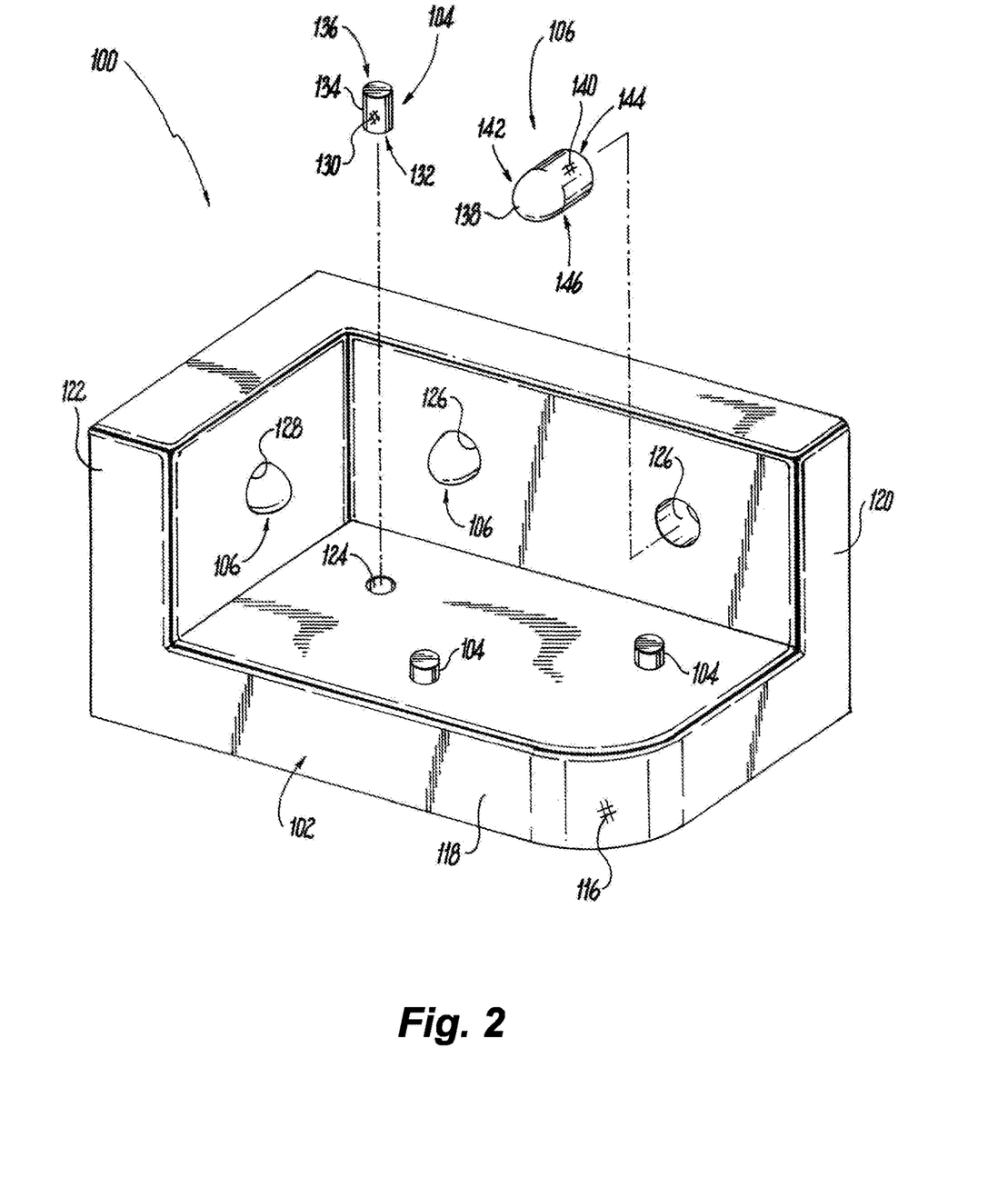
FIG. 2 is a perspective and partially exploded view of the fixture of FIG. 1 according to an exemplary embodiment, showing a fixture body having face contacts and point contacts for supporting and locating an additively manufactured workpiece in the fixture.

With reference to FIG. 2, EDM fixture 100 is shown. EDM fixture 100 includes a fixture body 102, three electrically conductive face contacts 104, and three electrically resistive point contacts 106. Face contacts 104 and point contacts 106 are each seated in fixture body 102 seated in fixture body 102 to define a 3-2-1 alignment system 110 (shown in FIG. 3) for locating an additively manufactured workpiece 12 (shown in FIG. 1) relative to fixture body 102 during an EDM operation.

Fixture body 102 includes a base portion 118, a back portion 120, and a side portion 122. Back portion 120 extends from base portion 118. Side portion 122 extends from both base portion 118 and back portion 120. It is contemplated that fixture body 102 be formed from an electrically conductive material 116 to connect additively manufactured workpiece 12 (shown in FIG. 1) to ground through face contacts 104.

Base portion 118 defines a plurality of base apertures 124. Each base aperture 124 seats a face contact 104. In the illustrated exemplary embodiment base portion 118 seats three (3) face contacts 104. Back portion 120 defines a plurality of back apertures 126. Each back aperture 126 seats a point contact 106. In the illustrated exemplary embodiment back portion 120 seats two (2) point contacts 106. Side portion 122 has a single side aperture 128, a single point contact 106 seating within side aperture 128.

Face contacts 104 each have a dowel-like body 134. Dowel-like body 134 extends between a fixture end 132 and an opposite face end 136, and is formed from an electrically conductive material 130. Examples of suitable electrically conductive materials copper, aluminum, and certain types of steel. Fixture end 132 is configured and adapted for seating in base aperture 124 such that face end 136 of face contact 104 is in electrical communication with fixture body 102. Face end 136 is configured and adapted for locating additively manufactured workpiece 12 (shown in FIG. 1) at a contact area of face end 136 to electrically connect additively manufactured workpiece 12 to fixture body 102 through dowel-like body 134.

Point contacts 106 each have a bullet-shaped body 146. Bullet-shaped body 146 extends between a fixture end 144 and an opposite tip 138, and is formed from an electrically resistive material 140. In certain embodiments electrically resistive material 140 has electrical resistivity that is greater than electrical resistivity of electrically conductive material 130. In accordance with certain embodiments electrically resistive material 140 can have a hardness that is greater than a hardness of electrically conductive material 130. It is contemplated that electrically resistive material 140 can be a ceramic material, which provides both good electrical resistivity and wear resistance to additively manufactured workpiece 12. Tip 138 is configured and adapted for locating additively manufactured workpiece 12 (shown in FIG. 1) at tip 138 to electrically separate additively manufactured workpiece 12 via bullet-shaped body 146.

Figure 3:
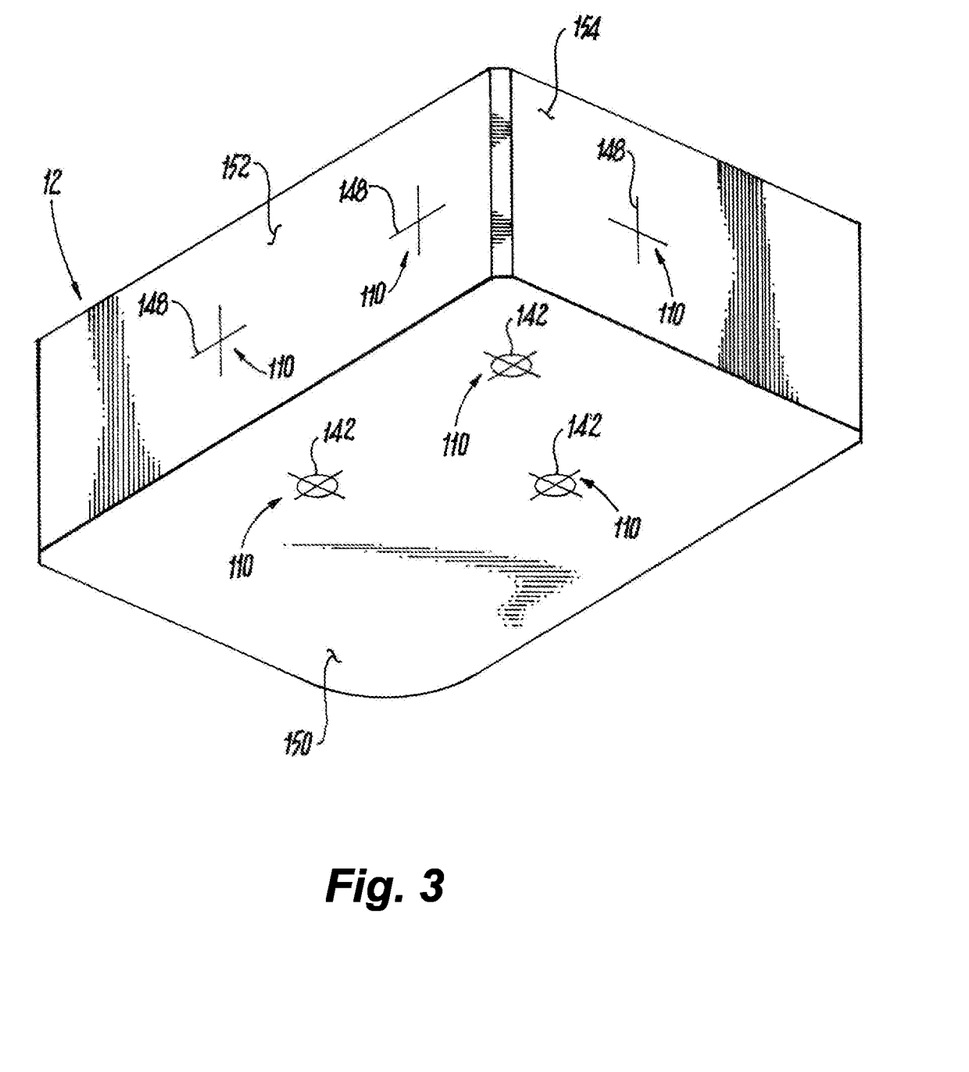
FIG. 3 is a perspective view of a datum space defined by the EDM fixture of FIG. 1, showing a 3-2-1 alignment system defined by the EDM fixture for locating the additively manufactured workpiece relative to the EDM fixture.

With reference to FIG. 3, additively manufactured workpiece 12 is shown. EDM fixture 100 locates additively manufactured workpiece 12 with a 3-2-1 alignment system 110. 3-2-1 alignment system 110 comprises three contact areas 142 on a first surface 150 of additively manufactured workpiece 12, two contact points 148 on a second surface 152 of additively manufactured workpiece 12, and a single contact point 148 on a third surface 154 of additively manufactured workpiece 12. The three contact areas of on a first surface 150 of additively manufactured workpiece 12 are where face ends 136 (shown in FIG. 2) of face contacts 104 (shown in FIG. 2) contact additively manufactured workpiece 12. The two contact points 148 on second surface 152 of additively manufactured workpiece 12 are where tips 138 (shown in FIG. 2) of point contacts 106 contact additively manufactured workpiece 12. The single contact point 158 of third surface 154 of additively manufactured workpiece 12 are where tip 138 (shown in FIG. 2) of where the point contact 106 seated in single aperture 128 contacts additively manufactured workpiece 12.

Figure 4:
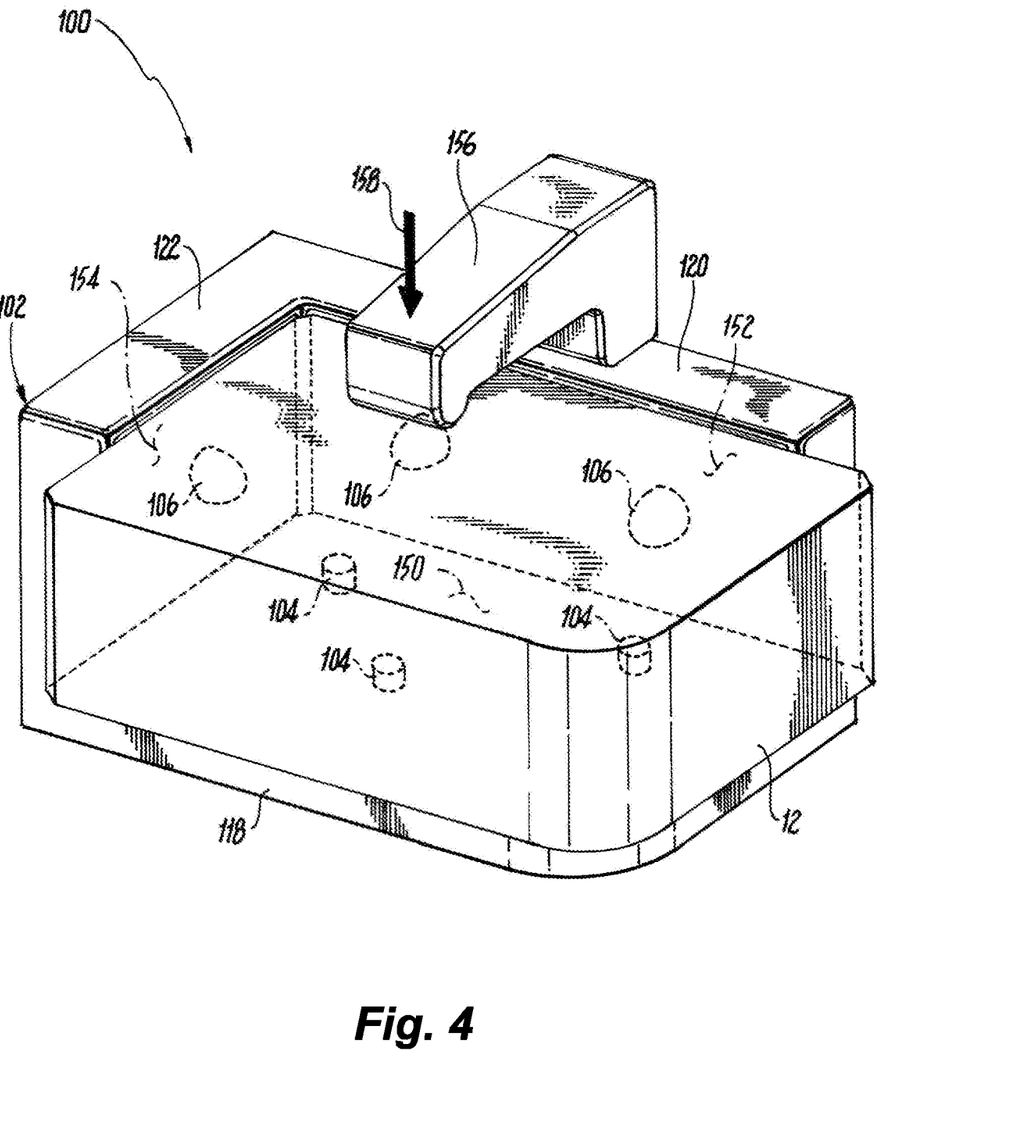
FIG. 4 is a perspective view of an additively manufactured workpiece supported in the EDM fixture of FIG. 1, showing a clamping member exerting a clamping force against the additively manufactured workpiece.

With reference to FIG. 4, additively manufactured workpiece 12 is shown supported in EDM fixture 100. Additively manufactured workpiece 12 is supported in EDM fixture 100 such that first surface 150 opposes base portion 118 with three (3) face contacts 104 interposed between first surface 150 and base portion, second surface 152 opposes back portion 120 with two (2) face contacts 104 interposed between second surface 152 and back portion 120, and third surface 154 opposes side portion 122 with single point contact 106 interposed between third surface 154 and side portion 122.

In the exemplary embodiment shown in FIG. 4 EDM fixture 100 includes a clamping member 156. Clamping member 156 is configured and adapted to exert a clamping force 158 on additively manufactured workpiece 12. Clamping force 158 is directed towards face contacts 104 to secure additively manufactured workpiece 12 in fixture body 102 once located in fixture body 102 by 3-2-1 alignment system 110 (shown in FIG. 3). Clamping force 158 can also reduce electrical resistivity between additively manufactured workpiece 12 and fixture body 102, improving current flow during an EDM operation to remove material from additively manufactured workpiece 12.

Figure 5:
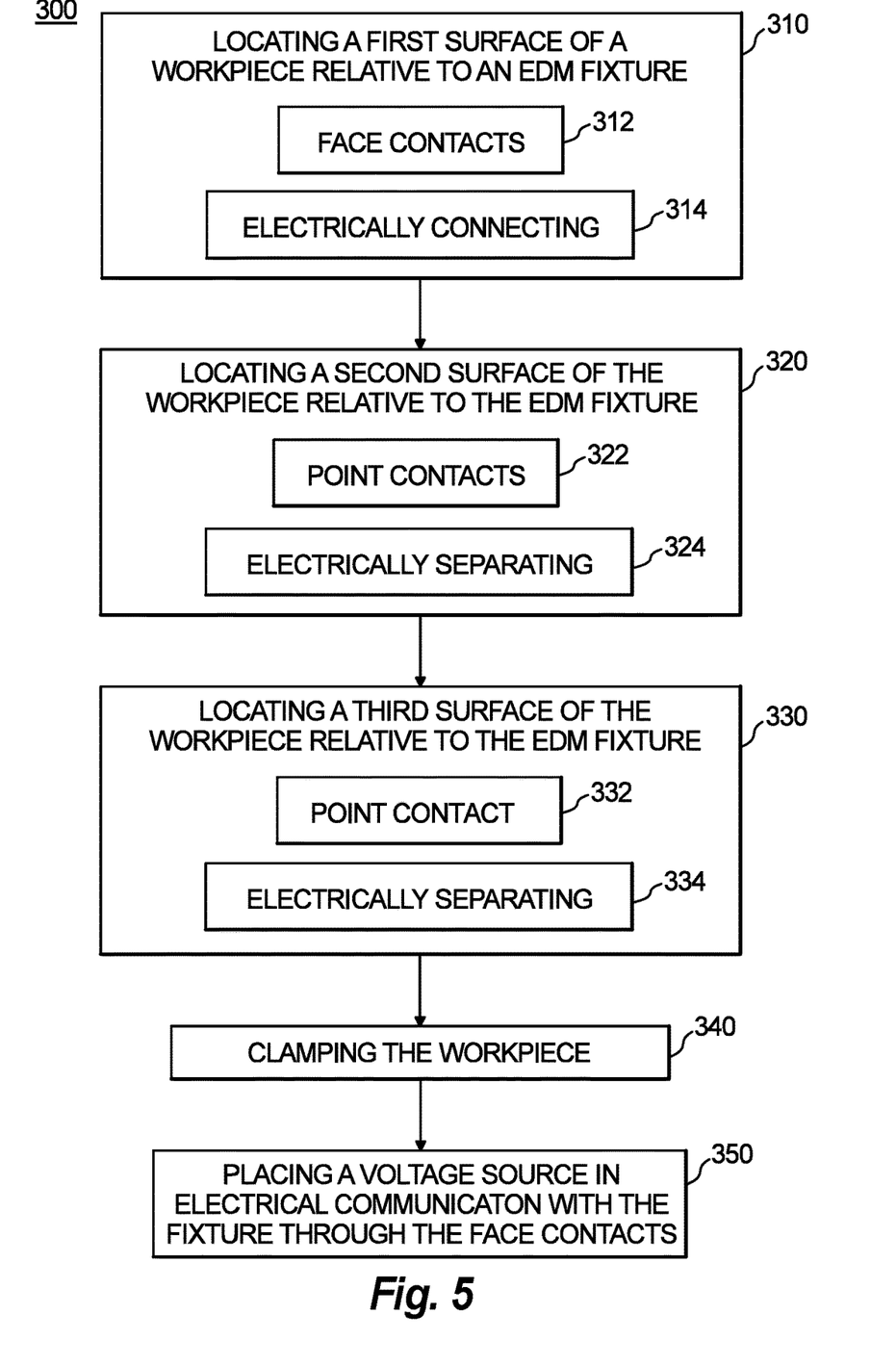
FIG. 5 is block diagram of a method of supporting an additively manufactured workpiece during an EDM operation, showing steps of the method.

With reference to FIG. 5, method 300 of supporting a workpiece, e.g., additively manufactured workpiece 12 (shown in FIG. 1) during an EDM operation is shown. Method 300 include, at an EDM fixture, e.g., EDM fixture 100 (shown in FIG. 1), locating a first surface, e.g., first surface 150 (shown in FIG. 3), as shown with box 310. The first surface of the workpiece is located relative to the EDM fixture with a plurality of face contacts, e.g., face contacts 104 (shown in FIG. 2), as shown with box 312. The face contacts can electrically connected the workpiece to the EDM fixture, as shown with box 314.

A second surface of the additively manufactured workpiece, e.g., second surface 152 (shown in FIG. 3), is located relative to the EDM fixture, as shown with box 320. The workpiece can be located relative to the EDM fixture with a plurality of point contacts, e.g., point contacts 106 (shown in FIG. 2), as shown with box 322. The point contacts can electrically separate the workpiece from the EDM fixture, as shown with box 324.

A third surface of the additively manufactured workpiece, e.g., third surface 154 (shown in FIG. 3), is located relative to the fixture, as shown with box 330. The third surface is located with a single point contact, as shown with box 332. The single point contact can electrically separate the workpiece from the fixture, as shown with box 334.

The workpiece is then secured in the EDM fixture by exerting a clamping force, e.g., clamping force 158 (shown in FIG. 4), as shown with box 340. A voltage source, e.g., voltage source 18 (shown in FIG. 1), is then placed electrical communication with the EDM fixture through the face contacts, as shown with box 350, and material removed from the workpiece. It is contemplated that material removed from the workpiece can include a build plate upon which the workpiece was constructed, and that the build plate be angled relative to the face contacts such that the location of the cut by the EDM apparatus remains constant irrespective of wear on the face contacts.

It is also contemplated that the additively manufactured workpiece can be electrically separated from the fixture body by the plurality of point contacts. The additively manufactured workpiece can be electrically connected to the fixture body through the plurality of face contacts. A voltage source of an EDM apparatus can be placed in electrical communication with the face contact through the additively manufactured workpiece.

The methods and systems of the present disclosure, as described above and shown in the drawings, provide for fixtures, fixture arrangements and methods of removing material from additively manufactured workpieces using EDM with superior properties, including reduced arcing and consistent placement through compensation for reduced electrical separation and increased wear that can result from the relatively rough surface contour of additively manufacture workpieces. While the apparatus and methods of the subject disclosure have been shown and described with reference to preferred embodiments, those skilled in the art will readily appreciate that changes and/or modifications may be made thereto without departing from the scope of the present disclosure.

What is claimed is:

1. An electrostatic discharge machining (EDM) fixture, comprising:
   a fixture body, wherein the fixture body has a base portion, a back portion extending from the base portion and a side portion extending from the base portion;
   a plurality of electrically conductive face contacts seated in the fixture body;
   a plurality of electrically resistive point contacts seated in the fixture body, wherein the plurality of electrically conductive face contacts and the plurality of electrically resistive point contacts define a 3-2-1 alignment system to locate an additively manufactured article relative to the fixture body during an electrostatic discharge machining operation, wherein the a 3-2-1 alignment system includes:

three of the plurality of electrically conductive face contacts seated in the base portion of the fixture body,
two of the electrically resistive point contacts are seated in the back portion of the fixture body, and
a single one of the plurality of electrically resistive point contacts is seated in the side portion of the fixture body;
an electrode;
a holder for electrode; and
a voltage source, wherein the voltage source configured to be in electrical communication with the additively manufactured article through fixture body.

2. The EDM fixture as recited in claim 1, wherein a material forming the plurality of electrically resistive point contacts has electrical resistivity greater than a material forming the plurality of electrically conductive face contacts.

3. The EDM fixture as recited in claim 1, wherein a material forming the plurality of electrically resistive point contacts has greater hardness that a material forming the plurality of electrically conductive face contacts.

4. The EDM fixture as recited in claim 1, wherein the plurality of electrically resistive point contacts are formed from a ceramic material.

5. The EDM fixture as recited in claim 1, further comprising a clamping member coupled to the fixture body.

6. The EDM fixture as recited in claim 5, wherein the clamping member is configured and adapted to exert a clamping force directed toward the plurality of electrically conductive face contacts.

7. The EDM fixture as recited in claim 1, further comprising an additively manufactured workpiece supported in the fixture and located relative to the fixture body by the plurality of electrically conductive face contacts and the plurality of electrically resistive point contacts.

8. An EDM arrangement, comprising:
an EDM fixture as recited in claim 1, and
an additively manufactured workpiece supported in the fixture and located relative to the fixture body by each of the plurality of electrically conductive face contacts and each of the plurality of electrically resistive point contacts.

9. The EDM arrangement as recited in claim 8, further comprising an EDM apparatus in electrical communication with the fixture body through the additively manufactured workpiece.

* * * * *